United States Patent [19]

Wegner

[11] Patent Number: 4,752,991
[45] Date of Patent: Jun. 28, 1988

[54] CLAMP MECHANISM FOR AN ELONGATE ELEMENT

[76] Inventor: Richard A. Wegner, 20381 U.S. 12, White Pigeon, Mich. 49099

[21] Appl. No.: 28,283

[22] Filed: Mar. 20, 1987

[51] Int. Cl.[4] ............................................. F16G 11/00
[52] U.S. Cl. .................................... 24/132 R; 24/569
[58] Field of Search ...... 24/132 R, 132 AA, 132 WL, 24/535, 598; 403/330

[56] References Cited

U.S. PATENT DOCUMENTS

| | | | |
|---|---|---|---|
| 542,767 | 7/1895 | Hunt | 24/132 R |
| 749,760 | 1/1904 | Townsend | 24/132 R |
| 1,591,525 | 7/1926 | Gardner et al. | 24/132 R |
| 1,595,551 | 8/1926 | Huber | 24/132 R |
| 1,800,004 | 4/1931 | Armstrong | 24/132 R |
| 2,149,518 | 3/1939 | Frank, Sr. | 24/132 R |
| 2,560,723 | 7/1951 | Hansen | 24/132 R |
| 2,766,502 | 10/1956 | Von Ranson | 24/535 |
| 2,896,288 | 7/1959 | Davis | 24/598 |
| 4,126,095 | 11/1978 | Tillery | 24/132 R |
| 4,308,643 | 1/1982 | Montplaisir | 24/132 R |

FOREIGN PATENT DOCUMENTS

| | | | |
|---|---|---|---|
| 0250142 | 5/1948 | Switzerland | 24/569 |
| 1403884 | 8/1975 | United Kingdom | 24/598 |

*Primary Examiner*—Victor N. Sakran
*Attorney, Agent, or Firm*—Flynn, Thiel, Boutell & Tanis

[57] ABSTRACT

A clamp apparatus which can releasably grip an elongate element includes first and second jaw members supported for relative movement between gripping and release positions. The first jaw member has thereon first and second surface portions and a recess therebetween, the first and second surface portions facing in a first direction toward the second jaw member and being spaced from each other in a second direction which is perpendicular to the first direction. The second jaw has thereon a projection which extends toward the first jaw, the projection being aligned with and having a width in the second direction which is less than the width in the second direction of the recess in the first jaw member.

23 Claims, 4 Drawing Sheets

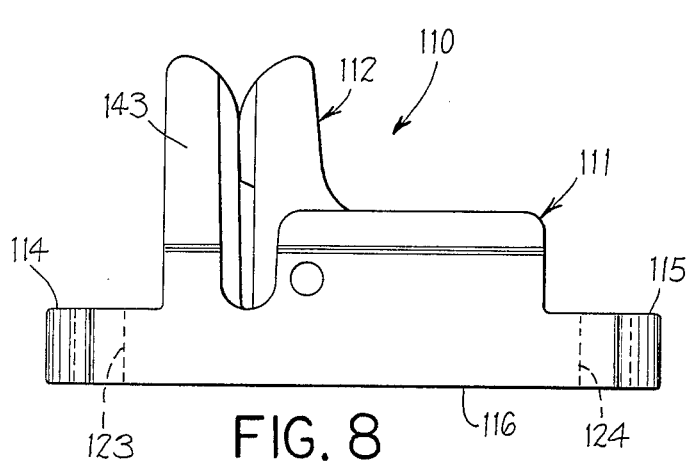
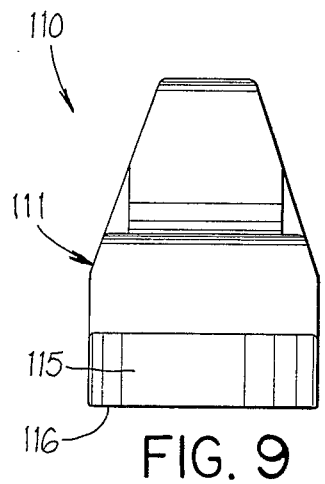
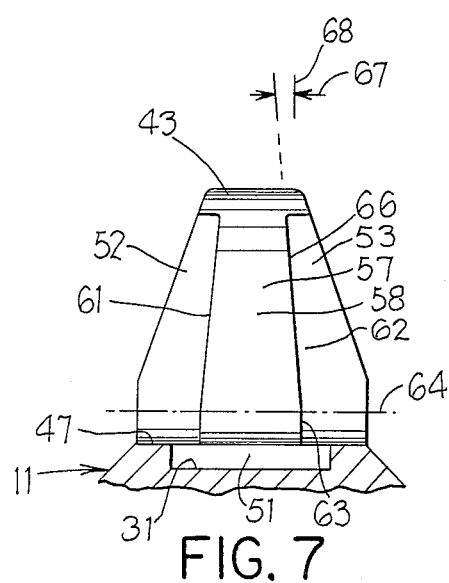
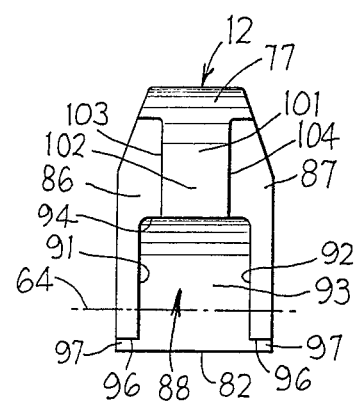

4,752,991

CLAMP MECHANISM FOR AN ELONGATE ELEMENT

FIELD OF THE INVENTION

This invention relates to a clamping mechanism and, more specifically to a clamping mechanism adapted to releasably grip an elongate element such as a rope.

BACKGROUND OF THE INVENTION

When fishing from a boat, there are usually several ropes or cords which must be releasably gripped, such as a mooring or anchor rope which holds the boat in position, a cord which is attached to a submerged and perforated receptacle containing minnows or other live bait, and the cord of a fish stringer which is trailed overboard and has attached to it fish which have been caught. These various ropes and cords frequently differ significantly in diameter.

A wide variety of clamping mechanisms have previously been developed for releasably gripping ropes or cords. While generally adequate for their intended purposes, these prior clamping mechanisms have not been satisfactory in all respects. For example, the design of these prior devices is often such that a given device works well with a rope of large diameter but not a cord of small diameter, or works well with a cord of small diameter but not a rope of large diameter. Moreover, in some such clamps, forces acting on the rope or cord have a tendency to cause the rope or cord to work loose from the clamping mechanism.

Consequently, it is an object of the present invention to provide a clamping mechanism which is adapted to releasably and securely grip ropes and cords having a wide range of diametric sizes.

It is a further object of the invention to provide a clamping mechanism, as aforesaid, which permits the rope or cord to be easily and rapidly inserted, which securely holds the rope or cord, and which permits the rope or cord to be easily and rapidly released.

It is a further object of the invention to provide a clamping mechanism, as aforesaid, in which the presence of the rope or cord in the clamping mechanism tends to enhance the gripping action.

It is a further object of the invention to provide a clamping mechanism, as aforesaid, which is structurally simple and is relatively inexpensive to manufacture and assemble.

It is a further object of the invention to provide a clamping mechanism, as aforesaid, which is durable and requires no maintenance.

It is a further object of the invention to provide a clamping mechanism, as aforesaid, which can be utilized with virtually any boat, which can be easily moved from boat to boat, and which can if desired be permanently mounted on a boat.

SUMMARY OF THE INVENTION

The objects and purposes of the invention, including those set forth above, are met by providing a clamp apparatus which is adapted to releasably grip an elongate element and includes first and second jaw members supported for relative movement between gripping and release positions. The first jaw member has thereon first and second surface portions and a recess therebetween, the first and second surface portions facing in a first direction generally toward the second jaw member and being spaced from each other in a second direction which is perpendicular to the first direction. The second jaw has thereon a projection which extends toward the first jaw, the projection being aligned with and having a width in the second direction which is less than the width in the second direction of the recess in the first jaw member.

BRIEF DESCRIPTION OF THE DRAWINGS

Several preferred embodiments of the invention will be described in detail hereinafter with reference to the accompanying drawings, in which:

FIG. 6 is an elevational end view of the clamping member of FIG. 5;

FIG. 7 is a fragmentary sectional end view of part of the base shown in FIG. 4;

FIG. 8 is an elevational side view similar to FIG. 1 of an alternative embodiment of the clamp mechanism of FIG. 1;

FIG. 9 is an elevational end view of the clamp mechanism of FIG. 8;

DETAILED DESCRIPTION

Figure 1:
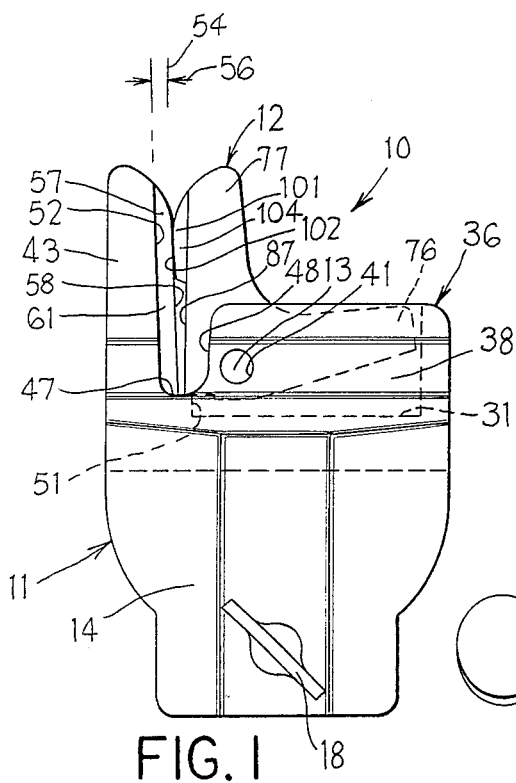
FIG. 1 is an elevational side view of a first embodiment of a clamp mechanism embodying the present invention.
Figure 2:
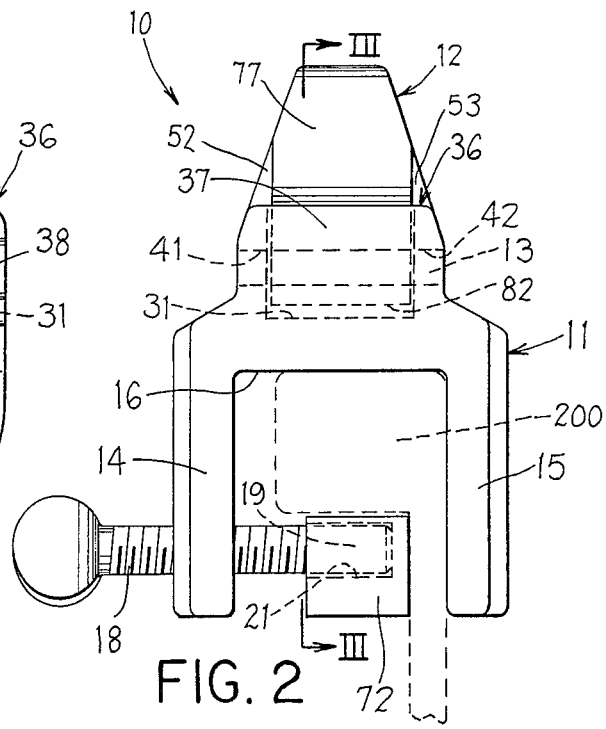
FIG. 2 is an elevational end view of the clamp mechanism of FIG. 1.
Figure 3:
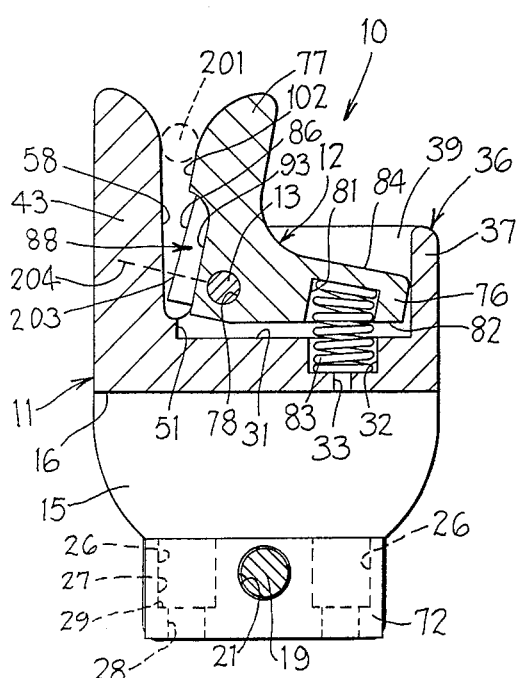
FIG. 3 is a sectional view taken along the line III—III of FIG. 2.
Figure 5:
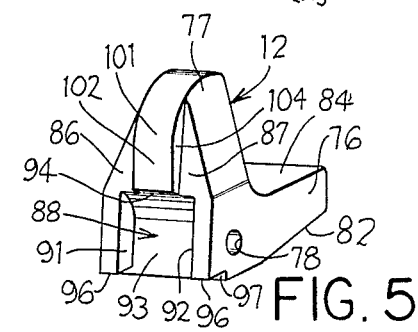
FIG. 5 is a perspective view of a clamping member which is a component of the clamp mechanism of FIG. 1.

FIGS. 1-3 illustrate a clamping mechanism 10 which embodies the present invention. The clamping mechanism 10 includes a base 11 and a clamping member 12 which is pivotally supported on the base 11 by an axle 13. The base 11 is shown separately in FIG. 4, and the clamping member 12 is shown separately in FIG. 5.

The base 11 includes two spaced and parallel flanges 14 and 15 which project downwardly from an underside 16 of the base 11. The flange 14 has a horizontal threaded hole 17 (FIG. 4) provided therethrough near the lower end thereof, and a thumbscrew 18 is threadably engaged in the threaded opening 17 so that it extends approximately perpendicular to the flange 14. The thumbscrew 18 has an end 19 which is located between the flanges 14 and 15.

Referring to FIGS. 2 and 3, a clamping element 22 has a blind bore 21 extending horizontally into it, the blind bore 21 having a diameter slightly greater than the diameter of the end 19 of the thumbscrew 18, the end 19 of the thumbscrew 18 being rotatably received in the blind bore 21. The clamping element 22 also has two spaced mounting bores 26 extending vertically through it on opposite sides of the blind bore 21. Each mounting bore 26 includes an upper portion 27, and a lower portion 28 which is of greater diameter than the upper portion 27. The upper and lower portions 27 and 28 are connected by an axially facing annular shoulder 29.

As best seen in FIG. 3, the base 11 has an upwardly facing planar surface 31 thereon, and a shallow circular recess 32 extends downwardly into the base 11 from the surface 31. A drain opening 33 having a diameter significantly less than that of the recess 32 extends downwardly from the lower end of the recess 32 and opens through the underside 16 of the base 11. The drain opening 33 prevents water from collecting in the recess 32.

The base 11 has a U-shaped flange 36 which extends upwardly from three lateral edges of the surface 31, the flange 36 including a bight portion 37 and two parallel side portions 38 and 39 which extend away from opposite ends of the bight portion 37. The side portions 38 and 39 of the flange 36 have, adjacent ends thereof remote from the bight portion 37, respective horizontally extending holes 41 and 42 which receive opposite ends of the axle 13.

Figure 4:
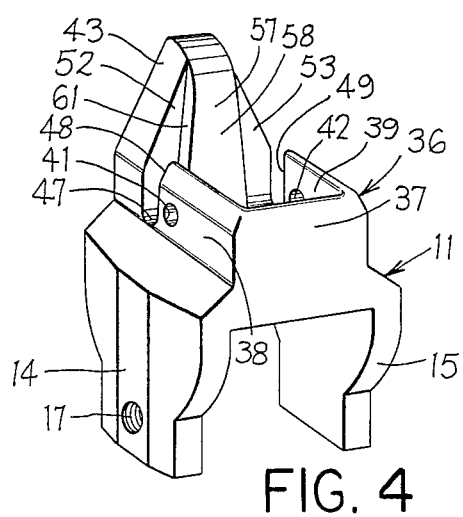
FIG. 4 is a perspective view of a base which is a component of the clamp mechanism of FIG. 1.

The base 11 also has thereon a jaw member 43 which projects upwardly at an end of the surface 31 remote from the bight portion 37 of the flange 36. As best seen in FIGS. 1 and 4, the base 11 has an upwardly facing semicircular surface 47 provided between the jaw member 43 and the ends 48 and 49 of the side portions 38 and 39 of the flange 36. The semicircular surface 47 merges smoothly into the surfaces on the ends 48 and 49 of the side portions 38 and 39. Intermediate the side portions 38 and 39 of the flange 36, the base 11 has a vertical step surface 51 which extends downwardly from the semicircular surface 47 to the upwardly facing surface 31 and which faces the bight portion 37 of flange 36.

The jaw member 43 has thereon two spaced and coplanar surfaces 52 and 53 which face the clamping member 12 and bight portion 37 and which, as shown in FIG. 1, are inclined with respect to a vertical reference 54 by an angle 56 which is preferably about 2°. At their lower ends, the surfaces 52 and 53 each merge smoothly into the upwardly facing semicircular surface 47. The jaw member 43 also has thereon an elongate projection 57 which is disposed between the surfaces 52 and 53 and projects outwardly past the surfaces 52 and 53 in a direction toward the clamping member 12 and bight portion 37 of flange 36. The projection 57 extends upwardly from the semicircular surface 47 almost to the top of the jaw member 43. The projection 57 has thereon a planar front surface 58 which faces the clamping member 12 and is substantially parallel to the coplanar surfaces 52 and 53. The jaw member 43 also has side surfaces 61 and 62 thereon which face in opposite directions, each of the side surfaces 61 and 62 extending from a lateral edge of the front surface 58 to an inner edge of a respective one of the surfaces 52 and 53 substantially perpendicular thereto. Consequently, the projection 57 has 90° corners at each lateral edge of the front surface 58. Referring to FIG. 7, each of the side surfaces 61 and 62 includes a vertical portion at the lower end thereof which extends upwardly from the semicircular surface 47 to a plane 64 which is horizontal and contains the axis of the pivot axle 13, and includes a tapered portion 66 which extends upwardly from the plane 64 so as to form with respect to a vertical reference 68 an angle 67 which is preferably about 5°.

Turning now to the clamping member 12, the clamping member 12 is approximately L-shaped in a side view and has two arms 76 and 77 which are approximately perpendicular to each other and which each extend approximately radially outwardly from a horizontal hole 78 provided through the clamping member 12. The axle 13 extends through the hole 78.

The arm 76 extends approximately horizontally outwardly from the axle 13, and is disposed within the U-shaped flange 36 so that edges of the arm 76 are near the inner surfaces of the bight portion 37 and side portions 38 and 39 of the flange 36. A shallow circular recess 81 extends upwardly into the arm 76 from an undersurface 82 thereof. A helical compression spring 83 has its ends disposed in the circular recesses 32 and 81, and continuously yieldably urges the clamping member 12 to pivot counterclockwise in FIG. 3. An upwardly facing surface 84 is provided on the upper side of the arm 76.

The arm 77 extends approximately vertically upwardly from the axle 13, and serves as a jaw member. The jaw member 77 has two spaced, coplanar surfaces 86 and 87 thereon which face the jaw member 43 on the base 11. The jaw member 77 has a recess 88 provided between lower portions of the surfaces 86 and 87. The recess 88 is defined by two facing, parallel, vertical side surfaces 91 and 92 which each extend away from an inner edge of a respective one of the surfaces 86 and 87 perpendicular thereto, a planar back surface 93 which is parallel to and faces in the same direction as the surfaces 86 and 87, and a top surface 94 which curves rearwardly and downwardly and merges smoothly into the back surface 93. At the lower end of each of the surfaces 86 and 87 is a cutaway 96 having an inner end surface 97 which is coplanar with the back surface 93 of the recess 88.

The jaw member 77 also has an elongate projection 101 which extends upwardly from the top of the recess 88 to a location near the top of the jaw member 77, and which is located between the upper portions of the surfaces 86 and 87 and projects outwardly past them toward the jaw member 43. The projection 101 has a convexly curved front surface 102 thereon which faces and can engage an upper portion of the front surface 58 on the projection 57. The projection 101 has planar and parallel side surfaces 103 and 104 which are perpendicular to the surfaces 86, 87 and 102 and which each extend between a respective one of the side surfaces 103 and 104 and a respective lateral edge of the front surface 102.

Referring to FIGS. 6 and 7, the width of the projection 57 at the lower end thereof, or in other words the distance between the portions 63 of the surfaces 61 and 62, is in the preferred embodiment approximately 83% of the width of the recess 88, which is the distance between the surfaces 91 and 92. Similarly, the width of the projection 101, or in other words the distance between the side surfaces 103 and 104, is in the preferred embodiment approximately 58% of the width of the recess 88.

Each of the component parts of the preferred embodiment is preferably made of a material which is corrosion resistant, for example aluminum, stainless steel, plastic, or galvanized iron or steel.

Figure 14:
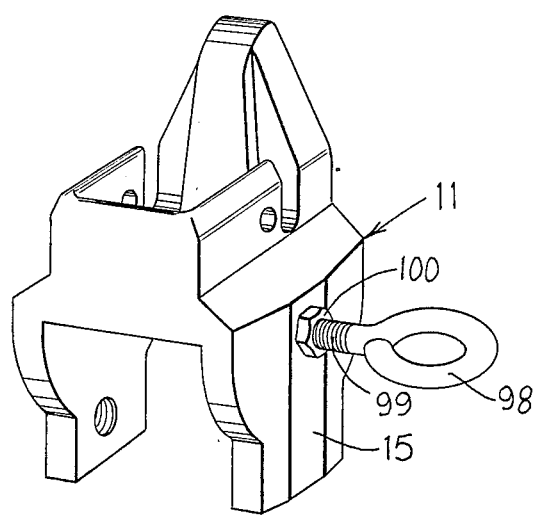
FIG. 14 is a perspective view of a base which is a component of the embodiment of FIG. 1 and which has an optional guide eyebolt secured thereon.

FIG. 14 depicts an optional eyebolt which has a closed circular guide loop 98 and a threaded shank 99 which threadedly engages a threaded bore provided in the base 11. A lock nut 100 is provided on the shank 99 and is tightened up against the base 11 in order to secure the eyebolt in place. An elongate element to be held by the clamp mechanism can be threaded through the loop 98 so that lengthwise forces can be exerted on the elongate element in almost any direction without causing it to work loose from the clamping mechanism.

FIGS. 8 and 9 illustrate a clamping mechanism 110 which is an alternative embodiment of the clamping mechanism 10 shown in FIGS. 1-7. Except as described below, the clamping mechanism 110 is identical to the clamping mechanism 10.

More specifically, the base 111 of the mechanism 10 differs from the base 11 of the mechanism 10 in that the base 111 has no structure at all below the undersurface 116 thereof. Instead, the base 111 has two mounting flanges 114 and 115 which project horizontally outwardly in opposite directions from opposite ends of the base 111. The undersurface of each of the mounting flanges 114 and 115 is a coplanar extension of the planar undersurface 116 of the base 111. The mounting flanges 114 and 115 have respective holes 123 and 124 extending vertically therethrough. In all other respects, the base 111 of the clamping device 110 is identical to the base 111 of the clamping device 10.

Figure 10:
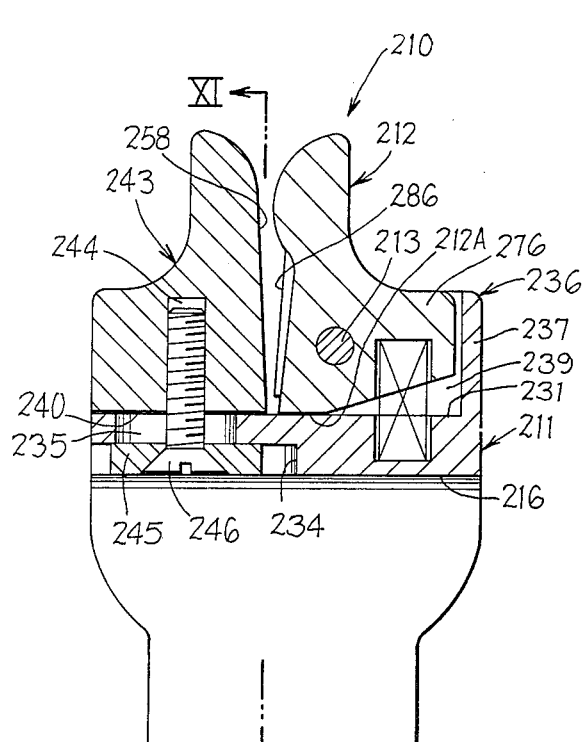
FIG. 10 is a sectional side view similar to FIG. 3 of a further alternative embodiment of the clamp mechanism of FIG. 1.
Figure 11:
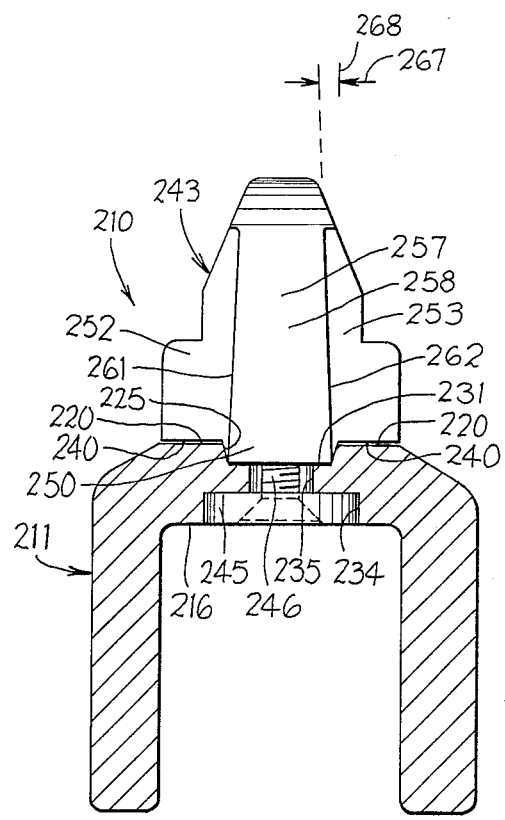
FIG. 11 is a sectional view taken along the line XI—XI in FIG. 10.

FIGS. 10 and 11 illustrate a clamping mechanism 210 which is a further alternative embodiment of the clamping mechanism 10 shown in FIGS. 1-7. Except for the differences described below, clamping mechanism 210 is basically identical to the clamping mechanism 10.

In particular, the base 211 has a U-shaped flange 236, but the two side portions of the flange 236, only one of which is visible at 239 in FIG. 10, have been shortened in length, and the axle 213 supported by them is thus positioned somewhat closer to the bight portion 237 of the flange 236. The jaw member 243 is not an integral part of the base 211, but is a separate part described in more detail below. The base 211 has an elongate recess or groove 234 which is provided in the undersurface 216 thereof and extends in a direction perpendicular to the axis 213. The base 211 has, as best seen in FIG. 11, two spaced and upwardly facing coplanar surfaces 220, and an elongate recess or groove 225 therebetween which extends parallel to the groove 234, the bottom of the groove 225 being a coplanar extension of the upwardly facing surface 231 on the base member 211. As shown in FIG. 11, the side walls of the groove 225 diverge upwardly with respect to each other. The base 211 has a slot 235 which opens into the grooves 234 and 225, which extends parallel to the grooves 234 and 225, and which as shown in FIG. 11 has a transverse width which is less than the width of the groove 234.

The jaw member 243 has spaced and coplanar undersurfaces 240 which face and are adjacent the two surfaces 220 on base 211, and has a guide projection 250 which projects downwardly past the surfaces 240 from between them and which is slidably received in the groove 225 in the base 211, the projection 250 having upwardly diverging side surfaces which slidably engage the upwardly diverging side surfaces of the groove 225. The jaw member 243 has a threaded hole 244 which extends vertically upwardly thereinto from the underside of the projection 250. The jaw member 243 has coplanar surfaces 252 and 253 and a projection 257 which are similar to the surfaces 52 and 53 and projection 57 in the embodiment of FIG. 1, except that the projection 257 extends downwardly all the way to the bottom of the downward projection 250 and has side surfaces 261 and 262 which diverge downwardly with respect to each other all the way to the bottom of the projection 250, each of the side surfaces 261 and 262 forming an angle 267 of approximately 5° with respect to a vertical reference 268. The projection 257 has on it a front surface 258.

A flat plate 245 is slidably supported in the groove 234 of base 211 for movement therealong, and has extending through it a frustoconical opening which rotatably receives the frustoconical head of a flathead screw 246, the threaded shank of the screw 246 extending upwardly through the slot 235 and being threadably engaged in the threaded hole 244 in the jaw member 243.

Due to the smaller distance between the axle 213 and bight portion 237 of flange 236, the clamping member 212 has a horizontally extending arm 276 which is somewhat shorter than the horizontally extending arm 76 of the clamping member 12 in FIG. 1. Also, the clamping member 212 has on its underside a surface 212A which can engage surface 231 on base 211 in order to limit counterclockwise pivotal movement of clamping member 212. In other respects, however, these clamping members are similar. The clamping member 212 has thereon two coplanar surfaces, only one of which is visible at 286 in FIG. 10, which are equivalent to the surfaces 86 and 87 on the clamping member 12 of FIGS. 1 and 5.

Figure 12:
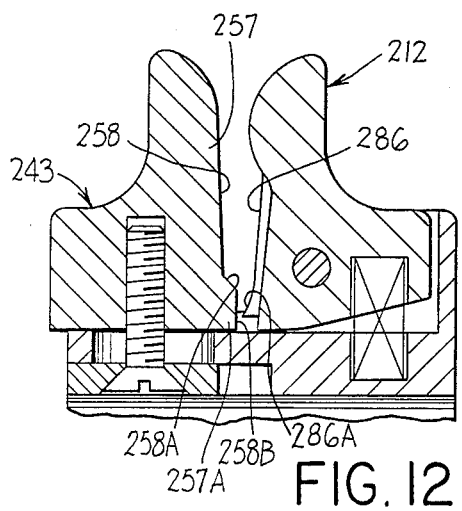
FIG. 12 is a fragmentary sectional side view showing an optional modification to the embodiment of FIG. 10.

FIG. 12 shows an optional modification to the embodiment of FIGS. 10 and 11. More specifically, the two surfaces, of which one is shown at 287, are shaped differently. In particular, the surface 286 has, at its lower end, a surface portion 286A which extends downwardly and outwardly toward the jaw member 243 with respect to the portion of the surface 286 above it, and the other surface has a similar shape. Further, the projection 257 on the jaw member 243 has at its lower end a portion 257A which projects outwardly somewhat further than the remainder of the projection 257, so that the front surface 258 on the projection 257 has at its lower end a portion 258A which extends downwardly and outwardly toward the clamping member 212 and a portion 258B which faces the clamping member 212 and is approximately parallel to the upper portion of the surface 258.

Figure 13:
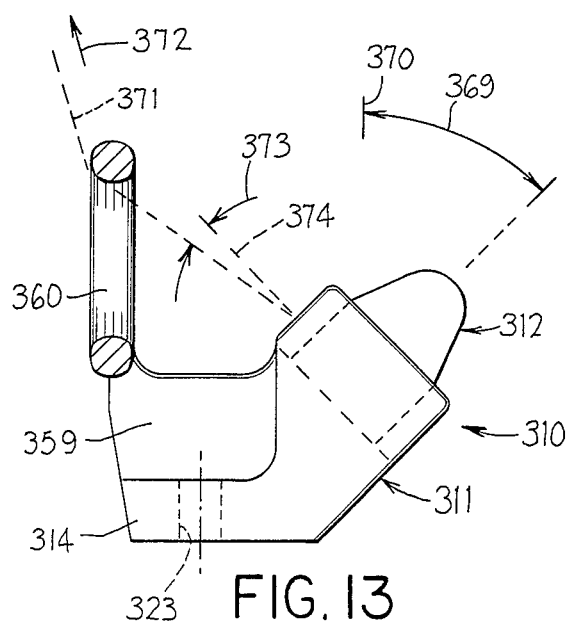
FIG. 13 is an elevational end view, partly in section, of yet another alternative embodiment of the inventive clamp mechanism.

Turning now to the embodiment of FIG. 13, a base 311 movably supports a clamping member 312 which is identical to the clamping member 12 shown in FIG. 3, and is therefore not described in detail. Further, the portion of the base 311 adjacent the clamping member 312 is identical in structure to the portion of the base member 11 which in FIG. 3 is located above the surface 16, and is therefore not described in detail. The base 311 has an integral, horizontally extending mounting flange 314, and at least one mounting hole 323 is provided through the flange 314. The base 311 also includes an integral rib 359 which extends upwardly from the flange 314, and a vertically oriented annular guide ring 360 is fixedly secured to the rib 359. The clamping member 312 is supported so that it is tilted at an angle 369 of about 45° with respect to a vertical reference 370, which means that the not-illustrated axle pivotally supporting the clamping member 312 is also oriented at about 45° with respect to the vertical reference 370. An elongate element releasably held by the clamping mechanism 310 is shown diagrammatically at 371.

OPERATION

The mounting of the clamping mechanism 10 will now be briefly described. The clamping device 10 of FIGS. 1-7 can be operationally mounted in one of two different ways. First, as shown in FIG. 2, the clamping mechanism 10 can be mounted on the gunwale 200 of a boat by placing the upper end of the gunwale between the flanges 14 and 15 of the base 11 and then manually tightening the thumbscrew so that the end 19 of the thumbscrew moves the clamping element 22 toward the flange 15 until the gunwale 200 is securely clamped therebetween. If the upper end of the gunwale is relatively wide, as shown in FIG. 2, the thumbscrew 18 should be first screwed outwardly until the end 19 thereof is disposed in the threaded opening 17 of the flange 14 and the clamping element 22 is separated from the thumbscrew 18. Then, the gunwale 200 is placed between the flanges 14 and 15, the clamping element 22 is placed in position, and the thumbscrew 18 is screwed inwardly, the end 19 of the thumbscrew 18 moving into the blind bore 21 in the clamping member 22 as the screw 18 advances. The clamping mechanism 10 can be removed from the gunwale 200 by performing in reverse sequence the steps used to attach it.

Alternatively, the clamping member 22 can be fixedly secured to an upwardly facing surface on an object by two conventional and not illustrated screws, each screw being disposed in a respective one of the bores 26, the underside of its head engaging the annular shoulder 29 and its shank extending through the smaller diameter bore portion 28 and into the object. Then, the flanges 14 and 15 can be placed on opposite sides of the clamping member 22, and the thumbscrew 18 can be screwed inwardly until the end 19 thereof is disposed in the blind bore 21 and the clamping member 22 is securely pressed against the flange 15, so that the clamping mechanism 10 is fixedly supported on the object. In this configuration, the clamping member 22 is normally left fixedly secured to the object, and the remainder of the clamping mechanism 10 can be releasably secured to or removed from the member 22 and the object, as desired.

Mounting of the clamping mechanism 210 of FIG. 10 is identical to that just described for the clamping mechanism 10 of FIG. 1.

The clamping mechanism 110 can be secured to an upwardly facing surface on an object using two conventional and not-illustrated screws, each screw having a head engaging an upper surface of a respective one of the mounting flanges 114 and 115 and having a shank which extends through a respective one of the holes 123 and 124 and into the object. Similarly, the clamping mechanism 310 of FIG. 13 can be secured to an upwardly facing surface by one or more screws, each of which has its head disposed against the upper side of the flange 314 and its shank extending through a respective hole 323 and into the object.

Turning now to operation of the clamping mechanism 10 of FIG. 1, FIG. 3 shows in broken lines a portion of an elongate element 201 of cylindrical cross section, for example a rope, which is to be clamped in the clamping mechanism 10. Prior to insertion of the elongate element 201, the clamping element 12 is urged to pivot counterclockwise by the spring 83 so that the front surfaces 58 and 102 on the jaw members 43 and 77 are in engagement. The elongate element 201 is inserted by manually pressing it downwardly between the jaws 43 and 77 so that the jaw member 77 is moved away from the jaw member 43 to a position spaced therefrom against the urging of the spring 83, as shown in FIG. 3. As the elongate element 201 moves downwardly, it slides on the front surfaces 58 and 102 of the jaw members 43 and 77 until it has passed the projection 101, and then slides on the front surface 58 and the coplanar surfaces 86 and 87. The elongate element 201 is moved downwardly until it is disposed against the upwardly facing semicircular surface 47 on the base 11. As the elongate element 201 moves downwardly along the surfaces 86 and 87, the portion thereof engaging the surfaces 86 and 87 will cross a line 203 defined by the intersection of the surfaces 86 and 87 and a plane 204 (FIG. 3) which is perpendicular to the surfaces 86 and 87 and which contains the axis of the pivot axle 13. Before the surface portion of the elongate element 201 engaging the surfaces 86 and 87 passes the line 203, the elongate element 201 urges the clamping member 12 to pivot clockwise, whereas after such surface portion passes the line 203, the elongate element 201 will urge the clamping member 12 to pivot counterclockwise toward the gripping position of FIG. 1. This ensures that, once the elongate element has been inserted into the clamping device 10, its presence will tend to resist clockwise movement of the clamping member 12 away from the position of FIG. 1 so that the elongate element 201 remains securely clamped in the clamping device and will have no tendency to work loose as a result of forces which are exerted on the elongate element 201 and tend to urge lengthwise movement thereof. Despite this feature, the elongate element 201 can be easily removed from the clamping device 10 when desired by simply exerting a manual upward force on the elongate element 201 so that it is moved out of the clamping device 10 in a direction in a manner directly opposite to its insertion. In order to assist removal of the elongate element, a downward force can be manually applied to the upwardly facing surface 84 on the clamping member 12, but the application of this manual force is optional and not a requirement.

As just described, when the elongate element 20 is fully inserted, it urges pivotal movement of the clamping member 12 in a counterclockwise direction in FIG. 3. Consequently, the spring 83 can, if desired, be omitted from the device 10, and the mechanism 10 will still operate satisfactorily. Thus, the spring 83 is provided primarily to enhance the operation of the clamping mechanism 10, because it effects an increase in the forces urging clockwise movement of the clamping member 12 following insertion of an elongate element and thus enhances the clamping effect.

With respect to the clamping mechanism 110 shown in FIGS. 8 and 9, the insertion, clamping and removal of an elongate element occurs in a manner identical to that just described for the clamping mechanism 10. Accordingly, further explanation of the operation of the clamping mechanism 110 is unnecessary.

Turning to the clamping mechanism 210 shown in FIGS. 10 and 11, as well as the modification thereof shown in FIG. 12, if the screw 246 is loosened, the clamping member 243 can be moved to the left or the right in FIG. 10 until the screw 246 engages an end of the slot 235, thereby permitting adjustment of the distance between the jaw member 243 and jaw member 77. When the jaw member 243 has been appropriately positioned, the screw 246 can be tightened in order to hold it in place. Referring to FIG. 11, tightening of the screw 246 causes the upwardly diverging side surfaces of the projection 250 and screw 225 to be pressed together, thereby producing a wedging effect which tends to help hold the jaw member 243 in position. While the clamping mechanism 10 of FIG. 1 can securely grip elongate elements having a relatively wide range of diametric sizes, the adjustability of the jaw member 243 in the embodiment of FIG. 10 effects a further increase in the wide range of diametric sizes with which the clamping mechanism 210 can be utilized. The insertion, clamping and removal of an elongate element occurs for the embodiment of FIG. 10 in a manner identical to that described above for the clamping mechanism 10, and is therefore not described again in detail.

With respect to the clamping mechanism 310 shown in FIG. 13, the positioning and size of the guide ring 360 are such that, regardless of the direction in which a force 372 is exerted on the free end of the elongate element 371, the portion of the elongate element extending from the clamping member 312 to the guide ring 360 will always be below and from an angle 373 of at least 20° with respect to a line 374 parallel to the axle supporting the clamping member 312. Consequently, regardless of the direction of application of the force 372, the resulting forces urging lengthwise movement of the elongate element 371 will have no tendency to pull the elongate element 371 out of the clamping mechanism, but instead will ensure that maximum gripping forces are exerted on the elongate element 371 no matter what the direction of application of the force 372. The insertion, clamping and removal of an elongate element occurs in a manner identical to that described above for the clamping mechanism 10, and is therefore not described in detail.

Although several preferred embodiments of the invention have been disclosed in detail for illustrative purposes, it will be recognized that variations or modifications of these embodiments, including the rearrangement of parts, lie within the scope of the present invention.

The embodiments of the invention in which an exclusive property or privilege is claimed are defined as follows:

1. A clamp apparatus adapted to releasably grip an elongate element, comprising first and second jaw members and means supporting said jaw members for relative movement between gripping and release positions; wherein said first jaw member has thereon first and second surface portions and a recess therebetween, said first and second surface portions facing in a first direction toward said second jaw member and being spaced from each other in a second direction which is perpendicular to said first direction; wherein said second jaw has thereon a projection, said projection extending toward said first jaw and being aligned with and having a width in said second direction which is less than the width in said second direction of said recess; wherein said recess in said first jaw member includes facing first and second side surfaces which are provided on opposite sides of said recess and which each extend into said recess in a direction away from said second jaw member from an edge of a respective one of said first and second surface portions on said first jaw member; and wherein said projection on said second jaw member has a front surface thereon which faces said first jaw and has first and second side surfaces on opposite sides thereof which face in opposite directions and each extend in a direction away from said first jaw member from a respective lateral edge of said front surface.

2. The clamp apparatus of claim 1, wherein said first and second surface portions on said first jaw member are approximately coplanar, wherein said first and second side surfaces of said recess respectively intersect said first and second surface portions on said first jaw member at an angle of approximately 90°, and wherein said front surface portion on said projection is generally planar and said first and second side surfaces on said projection each intersect said front surface thereon at an angle of approximately 90°.

3. The clamp apparatus of claim 2, wherein said first jaw member has in said recess a back surface which faces approximately in said first direction and which extends between inner ends of said first and second side surfaces of said recess, and wherein said second jaw member has first and second surface portions which face said first jaw member, which are disposed on opposite sides of said projection, and which are approximately coplanar, said projection projecting outwardly toward said first jaw member beyond said first and second surface portions of said second jaw member, and said side surfaces on said projection each extending from said front surface thereon to a lateral edge of a respective one of said first and second surface portions on said second jaw member.

4. The clamp apparatus of claim 1, wherein said relative movement of said first and second jaw members is pivotal movement about a pivot axis extending substantially parallel to said second direction.

5. The clamp apparatus of claim 4, wherein said projection on said second jaw member is elongate and extends approximately radially of said pivot axis; and wherein said first jaw member has thereon, at a location spaced farther radially outwardly than said recess, a projection which projects outwardly beyond said first and second surface portions on said first jaw member in a direction toward said second jaw member, said projection on said first jaw member having thereon an engaging surface which faces, is aligned with, and can engage a radially outer portion of said front surface on said second jaw member, said projection on said first jaw member having on opposite sides thereof first and second side surfaces facing in opposite directions which are approximately parallel to said second direction.

6. The clamp apparatus of claim 4, including a base on which said second jaw member is fixedly supported, and including a gripping member which is supported on said base for pivotal movement about said pivot axis and which has first and second arms extending outwardly from said pivot axis in respective directions which are approximately perpendicular, said first jaw member being said first arm of said gripping member.

7. The clamp apparatus of claim 6, including resilient means for yieldably urging relative movement of said jaw members toward said gripping position.

8. The clamp apparatus of claim 7, wherein said resilient means includes a helical compression spring having a first end disposed in a recess provided in said base and having a second end disposed in a recess provided in said second arm of said gripping member.

9. The clamp apparatus of claim 6, wherein said base has two spaced support flanges projecting outwardly therefrom approximately parallel to each other, one of said flanges having a threaded opening therethrough, including a thumbscrew threadably engaging said threaded opening in said one flange and having an end disposed between said flanges, and including a clamping member disposed between said flanges and having therein a blind bore, said end of said thumbscrew being rotatably disposed in said blind bore in said clamping member.

10. The clamp apparatus of claim 9, wherein said clamping member has first and second fastening bores which extend therethrough on opposite sides of and in a direction perpendicular to said blind bore, each said fastening bore having first and second portions of different diameter which are axially spaced.

11. The clamp apparatus of claim 6, wherein said base includes first and second mounting flanges projecting outwardly in opposite directions from opposite ends thereof, and includes a bore extending through each said mounting flange.

12. The clamp apparatus of claim 6, wherein said base has an approximately U-shaped flange projecting outwardly therefrom, said flange having a bight portion which is spaced from said second jaw member and having two spaced side portions which extend from said bight portion in a direction toward said second jaw member; including an axle which is coaxial with said pivot axis and extends between said side portions of said flange at a location spaced from said bight portion thereof, said axle extending through an opening provided in said gripping member; and wherein said second arm of said gripping member is disposed between said side portions of said flange and extends away from said axle in a direction toward said bight portion of said flange.

13. The clamp apparatus of claim 1, wherein said first and second side surfaces on said projection diverge with respect to each other in a direction which is approximately perpendicular to each of said first and second directions.

14. The clamp apparatus of claim 1, including a stationary guide member which is provided at a location spaced from said first and second jaw members and which can guide an elongate element releasably clamped by the clamp apparatus.

15. The clamp apparatus of claim 1, including a base on which said second jaw member is fixedly supported, wherein said first jaw member is supported on said base for pivotal movement about a pivot axis, wherein said base includes first and second platelike mounting flanges projecting outwardly in opposite directions from opposite ends thereof and includes a bore extending through each said mounting flange, and wherein said pivot axis is oriented at an acute angle with respect to a reference line which extends perpendicular to said flanges.

16. The clamp apparatus of claim 15, wherein said acute angle is approximately 45°.

17. A clamp apparatus adapted to releasably grip an elongate element, comprising first and second jaw members and means supporting said jaw members for relative movement between gripping and release positions; wherein said first jaw member has thereon first and second surface portions and a recess therebetween, said first and second surface portions facing in a first direction toward said second jaw member and being spaced from each other in a second direction which is perpendicular to said first direction; wherein said second jaw has thereon a projection, said projection extending toward said first jaw and being aligned with and having a width in said second direction which is less than the width in said second second direction of said recess; and including a base on which said first jaw member is supported for pivotal movement about an axis, means supporting said second jaw member on said base for movement relative thereto in directions toward and away from said axis of said first jaw member, and means for releasably securing said second jaw member against movement relative to said base.

18. The clamp apparatus of claim 17, wherein said base has first and second surfaces on opposite sides thereof, wherein said means supporting said second jaw member for movement relative to said base includes a first groove provided in said first surface of said base and a projection provided on said second jaw member and slidably disposed in said groove, and wherein said means for releasably securing said second jaw member against movement relative to said base includes a second groove provided in said second surface and extending parallel to said first groove, a slot extending parallel to and opening into said first and second grooves, a plate slidably disposed in said second groove, and a screw which has its head disposed against said plate and which extends through an opening in said plate and said slot and threadably engages a threaded opening provided in said second jaw member.

19. A clamp apparatus adapted to releasably grip an elongate element, comprising first and second jaw members and means supporting said jaw members for relative movement between gripping and release positions; wherein said first jaw member has thereon first and second surface portions and a recess therebetween, said first and second surface portions facing in a first direction toward said second jaw member and being spaced from each other in a second direction which is perpendicular to said first direction; wherein said second jaw has thereon a projection, said projection extending toward said first jaw and being aligned with and having a width in said second direction which is less than the width in said second direction of said recess; including a base on which said first and second jaw members are supported for relative pivotal movement about a pivot axis; and including a guide member which is provided on said base at a location spaced axially from said first and second jaw members and which can guide an elongate element releasably clamped by the clamp apparatus.

20. The clamp apparatus of claim 19, wherein said base has a mounting flange with a hole extending therethrough, wherein said pivot axis extends substantially parallel to said second direction and at an angle of approximately 45° with respect to said mounting flange, and wherein said guide member is an annular ring oriented so that a portion of an elongate element extending from said annular ring to said first and second jaw members extends at an angle of at least 20° with respect to said pivot axis of said first jaw member.

21. The clamp apparatus of claim 17, wherein said base has first and second surfaces on opposite sides thereof, wherein said means supporting said second jaw member for movement relative to said base includes a first groove provided in said first surface of said base and a projection provided on said second jaw member and slidably disposed in said groove, and wherein said means for releasably securing said second jaw member against movement relative to said base includes a second groove provided in said second surface and extending parallel to said first groove, a slot extending parallel to and opening into said first and second grooves, a plate slidably disposed in said second groove, and a screw extending slidably through said slot and cooperating with said plate and said second jaw member so as to urge them toward each other when said screw is rotated in a predetermined direction.

22. A clamp apparatus adapted to releasably grip an elongate element, comprising first and second jaw members and means supporting said jaw members for relative movement between gripping and release positions; wherein said first jaw member has thereon first and second surface portions and a recess therebetween, said first and second surface portions facing in a first direction toward said second jaw member and being spaced from each other in a second direction which is perpendicular to said first direction; wherein said second jaw has thereon a projection, said projection extending toward said first jaw and being aligned with and having a width in said second direction which is less than the width in said second direction of said recess; wherein said relative movement of said first and second jaw members is pivotal movement about a pivot axis which extends approximately parallel to said second direction and is disposed on a side of said first and second surface portions of said first jaw member remote from said second jaw member; and wherein a portion of an elongate element being inserted into said clamp apparatus extends approximately parallel to said second direction and slides along said first and second surface portions on said first jaw member between two positions in which a center line of the elongate element is respectively disposed on opposite sides of a plane which contains said pivot axis and extends parallel to said first direction.

23. A clamp apparatus adapted to releasably grip an elongate element, comprising first and second jaw members and means supporting said jaw members for relative movement between gripping and release positions; wherein said first jaw member has thereon first and second surface portions and a recess therebetween, said first and second surface portions facing in a first direction toward said second jaw member and being spaced from each other in a second direction which is perpendicular to said first direction; wherein said second jaw has thereon a projection, said projection extending toward said first jaw and being aligned with and having a width in said second direction which is less than the width in said second direction of said recess; wherein said first and second surface portions on said first jaw member each merge at one end thereof into a respective one of third and fourth surfaces on said first jaw member which extend outwardly toward said second jaw member at an angle to said first and second surface portions; and wherein said projection on said second jaw member has a front surface facing said first jaw member, said front surface including first, second and third portions, said first portion of said front surface merging at one end thereof into said second portion thereof, and said second portion of said front surface extending toward said first jaw member at an angle to said first portion thereof and merging into said third portion thereof, said third portion of said front surface extending approximately parallel to said first portion thereof, said first and second surface portions on said first jaw member being aligned in a lengthwise direction with said first portion of said front surface on said second jaw member, and said third and fourth surface portions of said first jaw member being aligned in a lengthwise direction with said second and third portions of said front surface on said second jaw member, so that when a portion of an elongate element extending approximatey parallel to said second direction is being inserted into said clamp apparatus, it slides along said first portion of said front surface on said second jaw member while sliding along said first and second surface portions on said first jaw member, and thereafter slides along said second and third portions of said front surface on said second jaw member while sliding along said third and fourth surface portions on said first jaw member, the elongate element being disposed between said third portion of said front surface on said second jaw member and said third and fourth surface portions on said first jaw member when releasably gripped by said clamp apparatus.

* * * * *